May 19, 1970  N. E. NORLANDER ET AL  3,512,562
METHOD AND APPARATUS FOR MAKING SIMULATED HAND SPLIT SHAKES
Filed March 1, 1968  5 Sheets-Sheet 1

INVENTORS
NORMAN E. NORLANDER
ROBERT A. KNOWLES
BY
ATTORNEYS

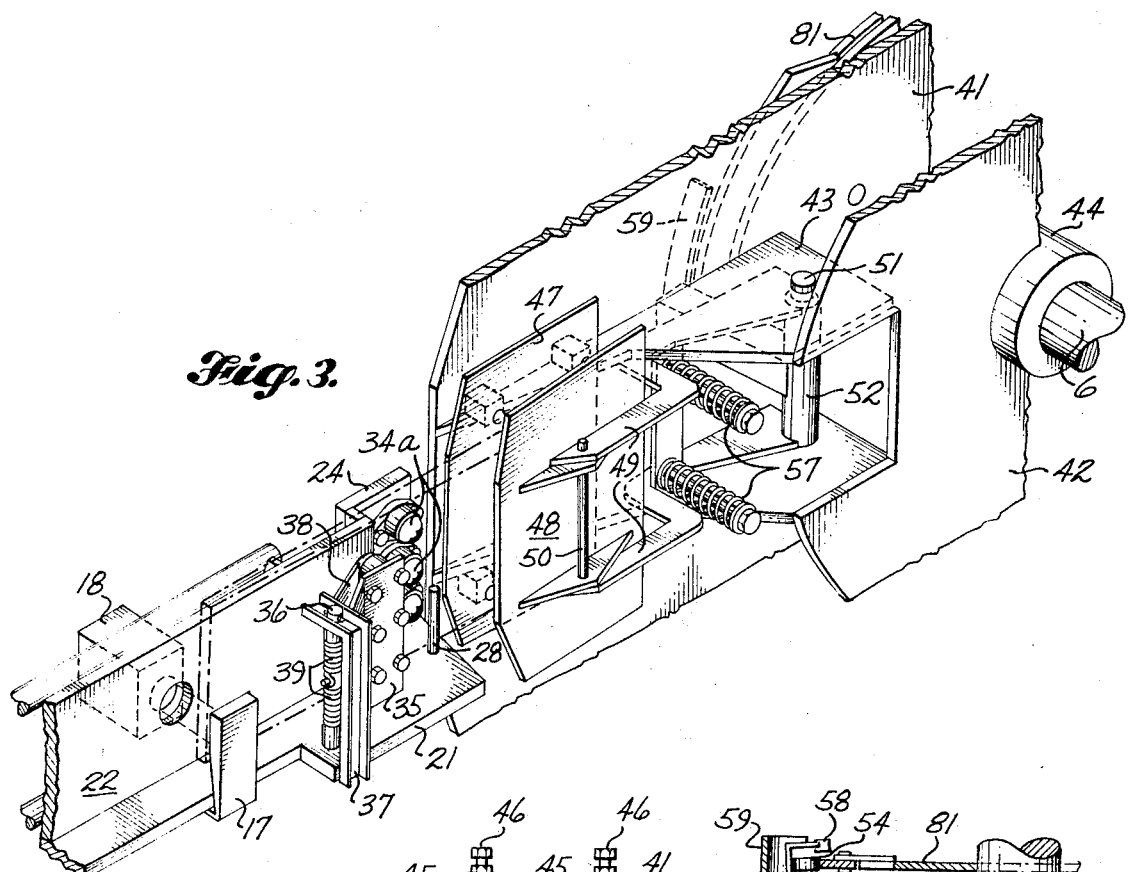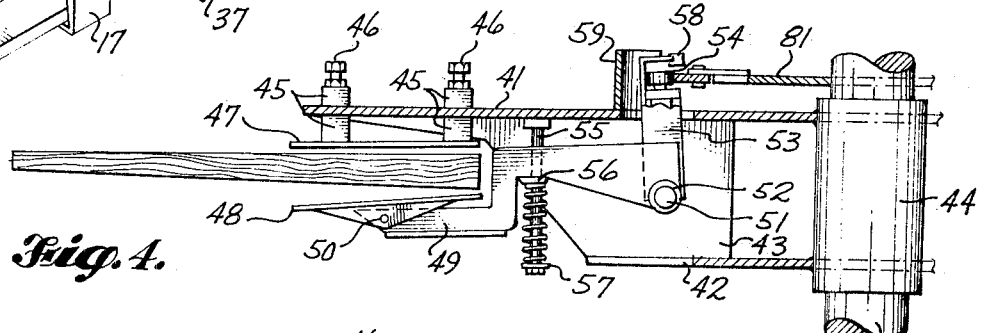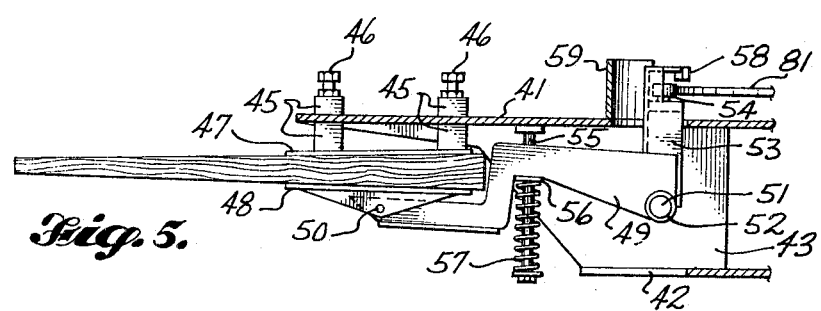

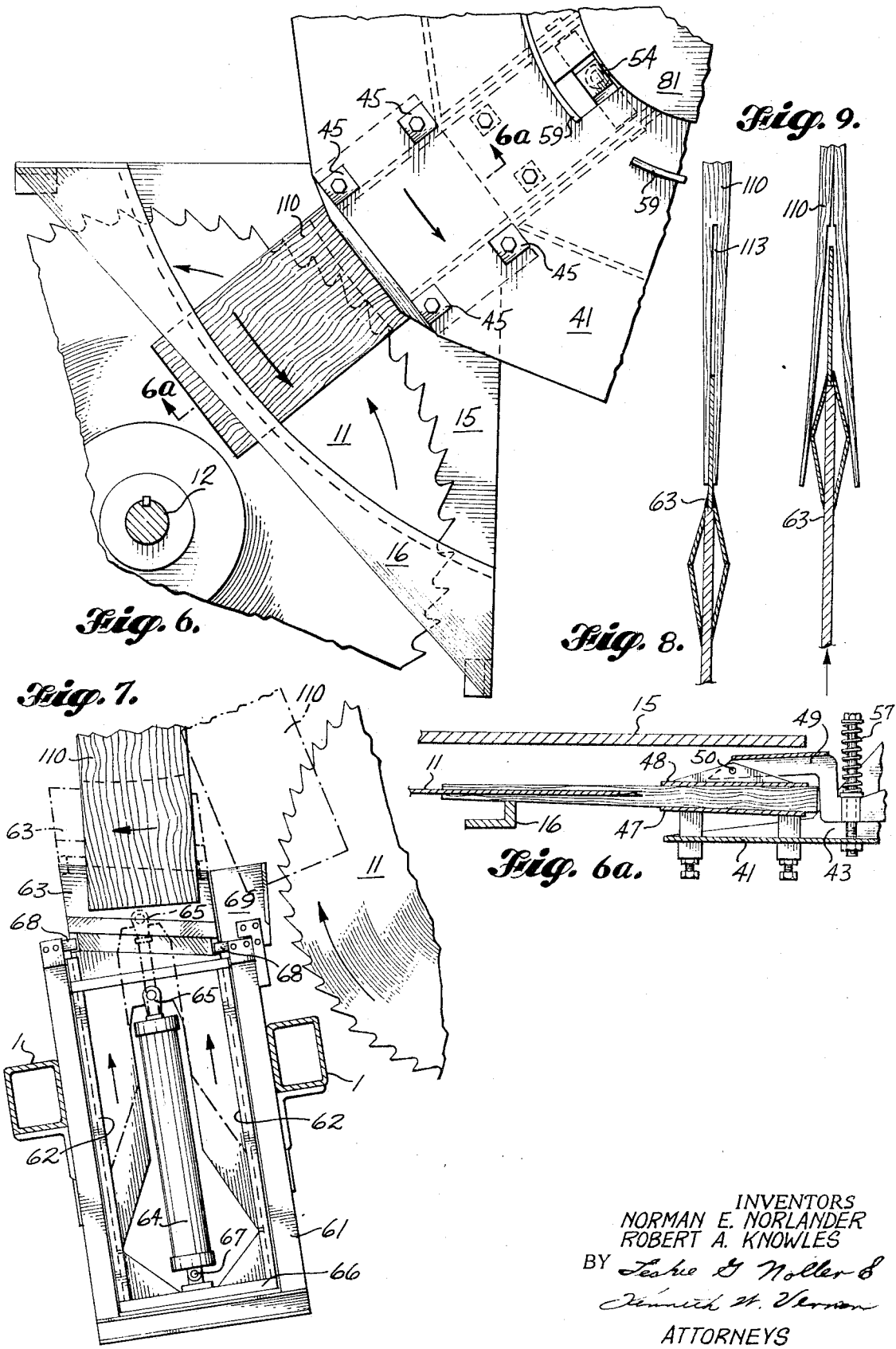

INVENTORS
NORMAN E. NORLANDER
ROBERT A. KNOWLES
BY
ATTORNEYS

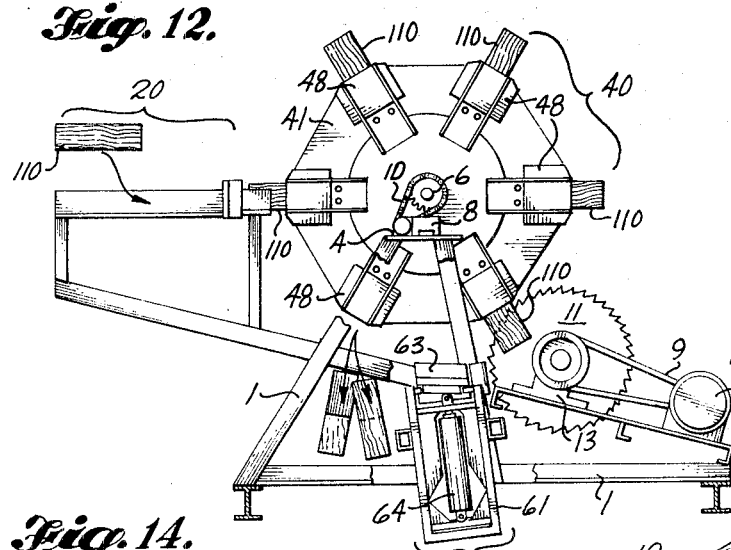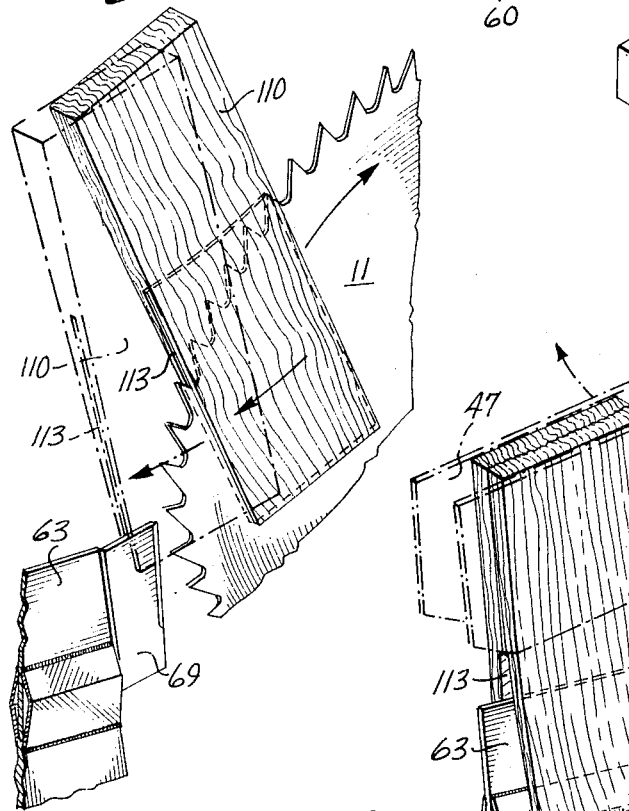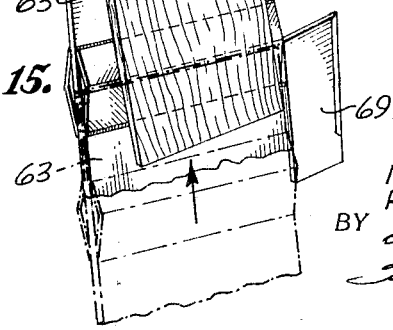

United States Patent Office 3,512,562
Patented May 19, 1970

3,512,562
METHOD AND APPARATUS FOR MAKING SIMULATED HAND SPLIT SHAKES
Norman E. Norlander, Longview, and Robert A. Knowles, Tacoma, Wash., assignors to Weyerhaeuser Company, Tacoma, Wash., a corporation of Washington
Filed Mar. 1, 1968, Ser. No. 709,657
Int. Cl. B27m *3/02*
U.S. Cl. 144—13                                     9 Claims

ABSTRACT OF THE DISCLOSURE

A method and apparatus for making natural split cedar shakes from pre-sawn wedge-shaped blanks by feeding the blanks one at a time to clamping positions located on the outer periphery of a rotatable, motor driven circular plate. The blanks are clamped so that the tapered end thereof extends outwardly from the clamps. The blanks, firmly held by the clamps, are then rotated through a power driven saw in line with the direction of the movement of the blanks where a kerf or slot is sawed partially therethrough. After leaving the saw, the blanks are rotated to a splitting position wherein a pneumatically driven splitter wedge also in line with the movement of the blank splits the wedge-shaped blank into two shakes, each having a smooth plane bottom face and an upper face having a smooth upper surface and a split grain lower surface. A cam assembly controls opening of the clamps to release the wedge-shaped blanks substantially simultaneously with the splitting operation and closing of the clamps at a predetermined feeding position.

BACKGROUND OF THE INVENTION

Field of the invention

This invention relates to a method and apparatus for cutting and splitting pre-sawn wedge-shaped blanks into natural split shakes.

Description of the prior art

Traditionally, hand split cedar shakes are made by splitting blanks of the desired dimension from wooden blocks by means of a froe placed on top of the block. The grain direction of the wooden block runs vertically of the block. This operation has been carried out by hand or by means of a splitting machine such as disclosed in U.S. Pat. No. 2,851,072. Each of the blanks split off has a flat portion caused by the froe entering the block with the remainder of the face being uneven and displaying a natural split grain face. The blanks are then cut on a diagonal between the two faces to form two shakes by means of band saws.

The making of shakes has been partially automated by shake sawing machines which eliminate some labor cost and reduce the dangerous hand sawing operation. Examples of these shake sawing machines are disclosed in U.S. Pat. Nos. 2,634,768; 2,705,028; and 3,079,961.

Methods have also been disclosed for making simulated hand shakes by scoring shingle blanks to simulate a natural split grain face. For example, see U.S. Pat. Nos. 2,646,093 and 2,987,088.

Other known methods and apparatus for making shakes are disclosed in U.S. Pat. Nos. 2,094,640; 2,771,107; and 3,315,717.

One particular method of making cedar shakes is disclosed in U.S. Pat. No. 1,785,830 wherein the tip of a wedge-shaped block is slotted along its longitudinal center line and then split into two shakes. The shakes produced by the instant apparatus of this invention are similar in appearance to those disclosed in the aforementioned patent.

The invention herein is in an improved method of making natural split shakes and in a unique apparatus for carrying out the operations involved.

SUMMARY OF THE INVENTION

This invention relates to a method and apparatus for making natural split shakes comprising a feeding station wherein wedge-shaped wood blanks are fed to a movable means having thereon a plurality of clamping positions, the butt end of the blanks being secured by the clamps. The blanks are then moved to a sawing position wherein a power driven saw in line with the movement of the blanks cuts a slot partially through the blank. The slotted blanks are then moved to a splitting position wherein means are provided to split the blanks into two pieces by driving a splitter knife through the unsawn portion of the blank. Suitable means are provided for activating the splitter knife and the clamps for operation at predetermined intervals.

More specifically, a wedge-shaped blank is placed on edge in a loading chute and pushed into feeding position where moving clamps, positioned around a circular, rotating plate, grasp and remove the blank from the loading chute. The blank is positioned in the loading chute in a way that the open clamp will move along the sides of the blank and, at the proper position on the clamp, close against the blank. Closing of the clamp is accomplished by cam means fixed to the frame of the apparatus. Pressure is exerted by the clamp on the blank by compressed springs or other suitable means so as to hold it securely in position. As the circular plate continues to rotate, the clamped blank moves out of the feeding position into sawing position. A power driven saw placed in line with the movement of the blank and a suitable distance away from the blank is provided to cut a slot of predetermined depth in the blank. As the blank passes through the saw, the tip of the blank rubs along an alignment surface. After leaving the saw the tip or tapered end of the blank slides onto an alignment fin also in line with the saw and the splitter assembly, the fin serving to prevent the kerf or slot from closing and to guide the blank onto the splitter knife. When the tapered blank is positioned on the splitter knife the clamp holding the blank is opened and the splitter knife activated. The splitter knife, driven by a fluid cylinder, drives through the unsawn portion of the blank producing two shakes, each having a smooth plane upper face and a natural split grain lower face.

The apparatus of this invention reduces the amount and skill of labor required to produce shakes and produces a shake with a flat sawn back and uniform tip while, at the same time, retaining the desirable characteristic of a natural split face. In addition, timber is utilized more effectively as the machine of this invention will process lumber considered too rough for hand split shakes.

BRIEF DESCRIPTION OF THE DRAWINGS

FIG. 3 is an enlarged fragmentary perspective view of the clamp assembly showing the wedge-shaped blank in clamping position.

FIG. 4 is a top sectional view of the clamping assembly shown in FIG. 3 with the clamp in open position.

FIG. 5 is a top cross sectional view of the clamping assembly of FIG. 3 showing the clamp in closed position.

FIG. 6 is an enlarged fragmentary side view of the saw assembly.

FIG. 6a is a view along line 6—6 of FIG. 6.

FIG. 7 is an enlarged fragmentary side view of the splitting assembly.

FIG. 8 is a partial cross sectional view of the splitting knife of FIG. 7 showing its entry into the kerf of the sawn wedge-shaped wood blank.

FIG. 9 is a partial cross sectional view of the splitting knife of FIG. 7 after activation showing how the wedge-shaped wood blank is split into two natural split shakes.

FIGS. 12 to 16 illustrate the method of operation of the apparatus of this invention.

DESCRIPTION OF THE PREFERRED EMBODIMENTS

Figure 1:
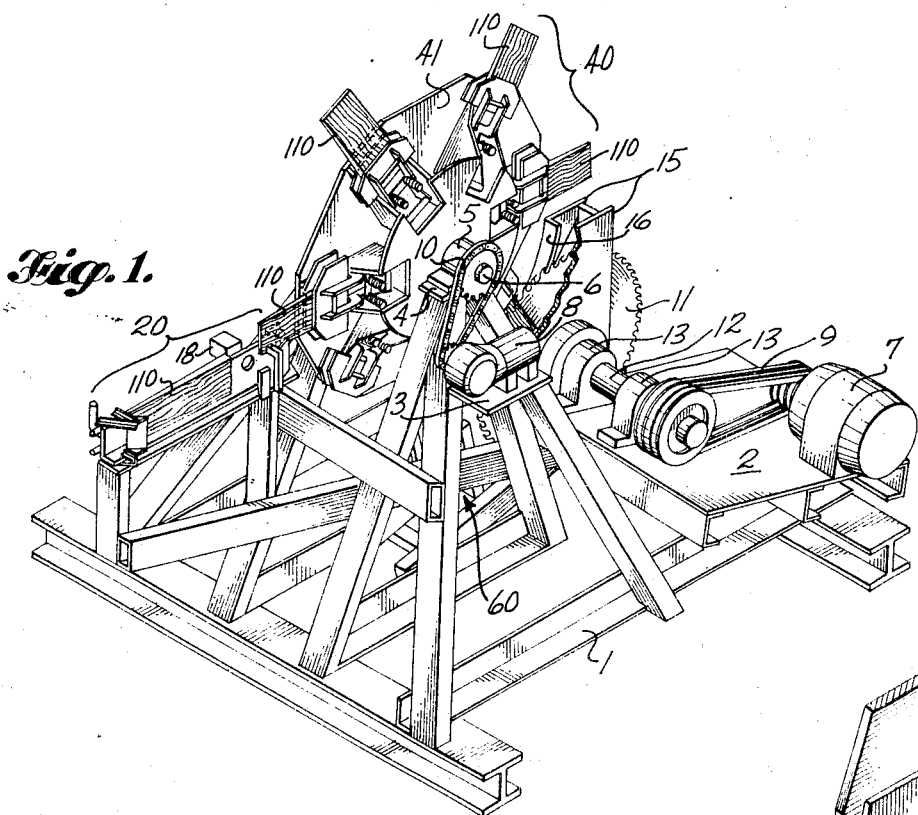
FIG. 1 is a perspective view of the overall apparatus of this invention.

FIG. 1 illustrates an overall perspective view of the shake machine including a feed assembly 20 for feeding wedge-shaped presawn wood blanks into clamping position, a clamp assembly 40 for conveying the blanks from the feed assembly to sawing position wherein a kerf or slot is sawed part way through them, and a splitting assembly 60 wherein the wedge-shaped blanks are split into two natural split shakes. The shake machine includes a supporting frame 1, on the apex 4 of which is mounted the clamp assembly. The clamp assembly 40 is rotatably mounted on shaft 6 and held in place by pillow blocks 5. The clamp assembly is turned by means of motor 8 mounted on motor base 3, the clamp assembly being driven by means of chain 10 trained over a suitable sprocket. The rotary saw 11 is mounted on a shaft 12 and secured by collars 14, the shaft being journalled through pillow blocks 13. Saw motor 7 attached to base plate 2 drives the saw by triple belts 9.

The cam assembly, not shown in FIG. 1, is secured to frame 1 and located adjacent clamping assembly 40.

Each of the assemblies, the feed assembly, clamp assembly, saw assembly, splitting assembly, and cam assembly will be referred to in more detail under the corresponding subheadings.

(1) Feed assembly

Figure 2:
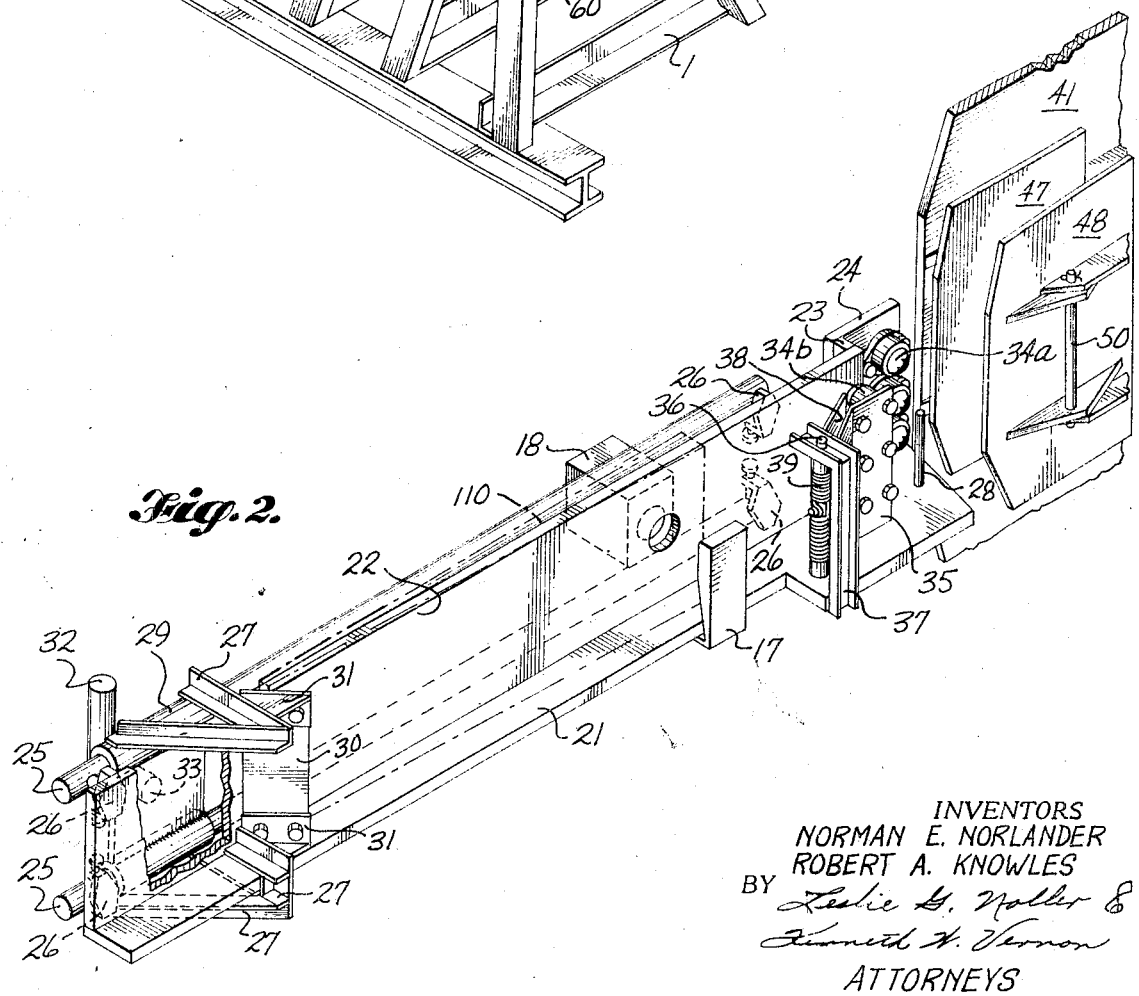
FIG. 2 is a perspective view of the feed assembly showing the sawn wedge-shaped wood blank in its initial position before being fed into the clamp assembly.

The feed assembly 20 is shown in FIG. 2 and comprises means for feeding a presawn wedge-shaped wood blank into open clamps as they rotate into position. The feed assembly comprises a horizontal floor plate 21 to which is attached a vertical guide plate 22. At the end of the floor plate adjacent the clamp assembly are located spacer plate 23 and support plate 24, the support plate being for the ball casters 34a. To guide plate 22 are secured two shafts 25 by means of mounts 26. A carriage assembly including housing 29, brackets 27 and 31, plate 30, handle 32, and support 33 is provided to inject the wedge-shaped blanks into the open clamps of the clamping assembly as the carriage assembly to which it is attached, is moved along shaft 25. This operation can be carried out automatically by fluid means if desired. A pin 28 is provided to gauge the thickness of the wood blanks.

In order to hold the blanks in position while they are being fed into the clamps of the clamping assembly, a spring biased means is provided including support 35 for ball casters 34b and support 37 fixed to floor plate 21 as shown. Support 35 is pivoted within support 37 by means of shaft 36 journalled through support 37 and floor plate 21. A spring 39 urges support member 35 and ball casters 34b mounted thereon toward vertical guide plate 22. A guard 38 is included to prevent the blank from lodging against ball casters 34b. Photocell 17 and light source 18 are included for safety reasons and their function will be described later.

(2) Clamp assembly

As shown in FIGS. 3, 4 and 5 the clamp assembly 40 serves to secure the wedge-shaped blank in position for delivery from the feed station to the saw station wherein a slot or kerf is sawed part way through the blank. In order to have uniform shakes it is necessary that the clamp assembly hold the blanks firmly. As shown in FIG. 1 there are six clamping positions on base plate 41. Obviously, additional clamp assemblies can be included if desired. Base plate 41 is secured to shaft 6 by means of hub 44 and rotates continuously when the machine is in operation. A stabilizer plate 42 is mounted forwardly of base plate 41. Two clamp supports 43 are mounted as shown for each of the clamp positions. Each of the clamp positions includes a fixed plate 47 mounted to base plate 41 by means of differential screws 46 and threaded bosses 45 and a movable plate 48 directly opposite fixed plate 47. The plates are adjustable to fit the contour of the wedge-shaped blank. The face of movable plate 48 is studded so that the sawn blank will be held firmly in position when the clamp is closed. Movable plate 48 is secured to two clamp arms 49 by means of pivot shaft 50. Clamp arms 49 are pivoted for movement around clamp shaft 51. Referring to FIGS. 4 and 5 cam follower arm 53 is also pivoted around clamp shaft 51 and attached to clamp arms 49 through bushing 52. Cam follower arm 53 projects through an opening in base plate 41. To the end of cam follower arm 53 is attached cam follower 54 which engages the surface of cam disc 81 which will be described in detail at a later time. Compressed springs 57 mounted over shaft 55 and forwardly of spring plate 56 continuously urge movable plate 48 into contact with fixed plate 47. On the back side of base plate 41 is located switch actuator surface 59. There is a switch actuator surface at each of the clamping positions. In addition, there is a second switch actuator surface 58 located on the end of each cam follower arm.

(3) Saw assembly

The saw assembly comprises a conventionally mounted rotary, power driven saw 11 positioned adjacent the clamp assembly and in line with the direction of movement of the wood blanks. An alignment surface 16 is provided as shown in FIGS. 6 and 6a to correctly position and stabilize each of the tapered banks as they are rotated into and through the sawing station. The alignment surface 16 contacts the blanks just prior to their entry into the saw.

(4) Splitting assembly

The splitting assembly 60 accepts the wedge-shaped wood blanks and by means of a wedge-shaped knife inserted in the slot or kerf sawn part way through the blanks, splits the blanks into two halves resulting in a split surface on each blank a rough hand split shake. The splitting assembly is positioned adjacent the saw 11 and comprises a supporting frame 61 attached to the main frame of the apparatus 1. On each side of the upright members of the supporting frame is located a channeled wedge guide 62 into which a splitting knife or wedge is placed. The configuration of the wedge is shown by FIGS. 8 and 9. The assembly is placed adjacent saw blade 11 so that wedge 63, having an upper knife-like portion, will fit into the kerf sawn by the saw blade on rotation of the clamp holding the blank. An alignment fin 69 may be provided adjacent the saw blade 11 to prevent the kerf or slot in the blank from closing and to guide the blank onto the upper portion of wedge 63. The alignment fin is secured to frame 61 by suitable means. Wedge 63 has four guide bars 68 located on each side to accurately guide it on activation. The presawn wedge-shaped blank is split by forcing wedge 63 upwardly so that the expanded portion thereof splits the sawn blank along its grain direction. This is shown by FIGS. 8 and 9. The wedge is pushed upwardly by fluid cylinder 64 whose piston is attached to wedge 63 by pin 65. The fluid cylinder is attached at its lower end to pivot shaft 66 by means of pin 67. On activation, the wedge is moved upwardly to split the sawn blank into two halves. Substantially simultaneously with activation of the splitting wedge is the opening of clamps 48 to release the wood blank.

(5) Cam assembly

Figure 10:
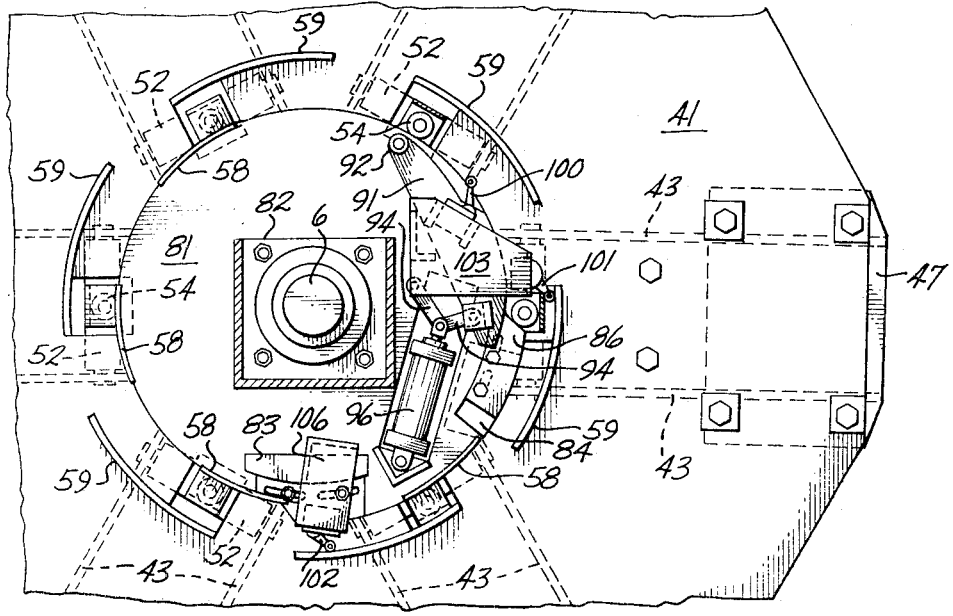
FIG. 10 is a partial side view of the cam assembly.

The cam assembly 80 controls opening and closing of the clamps 48 located around base plate 41 so as to close the clamps when they reach feeding position and open the clamps on activation of wedge 63 to split the sawn blank into two shakes. The cam assembly, shown in detail in FIGS. 10 and 11, comprises a fixed cam disc 81 located adjacent face plate 41. The cam disc 81 is secured to supporting frame 1 of the apparatus by bolts and a bracket 82 as shown in FIG. 10. As described earlier, each of the clamps 48 has associated with it a cam follower 54 which travels along the camming surface of cam disc 81. There are two positions on the camming surface of cam disc 81 controlling opening and closing of the clamps. Although the cam disc can be made in one piece with the clamp opening and clamp closing positions specifically designated, the camming surface can be made so that the position at which the clamps open and close can be adjusted. Clamp opening cam 85 is secured to cam disc 81 by suitable means as shown and is mounted on cam segment guide 83, aslo secured to cam disc 81. Clamp closing cam 86 is also secured to cam disc 81 by bolts or other suitable means as shown and also includes a cam segment guide 84. Cam follower 54, following camming surface 81, engages the contour surface of clamp opening cam 86 as shown substantially at the same time wedge 63 of the splitter assembly is activated so that the wedge-shaped blank is released.

(6) Limit switches

A number of limit switches are mounted to cam disc 81 to activate fluid cylinder 84 controlling wedge 63 and a safety mechanism, described later. Limit switches 100 and 101 are secured to switch mounting plate 103 which is in turn secured to cam disc 81 by bracket 104 (see FIG. 11). Limit switch 102 is mounted on switch mounting plate 106 which is in turn secured to cam disc 81 by bracket 105. Switches 101 and 102 are activated when they engage surface 59 of base plate 41. Limit switch 100 is activated by engagement with surface 58 which is connected to each of the cam follower arms 53 of the clamp assemblies.

(7) Safety mechanism

Figure 11:
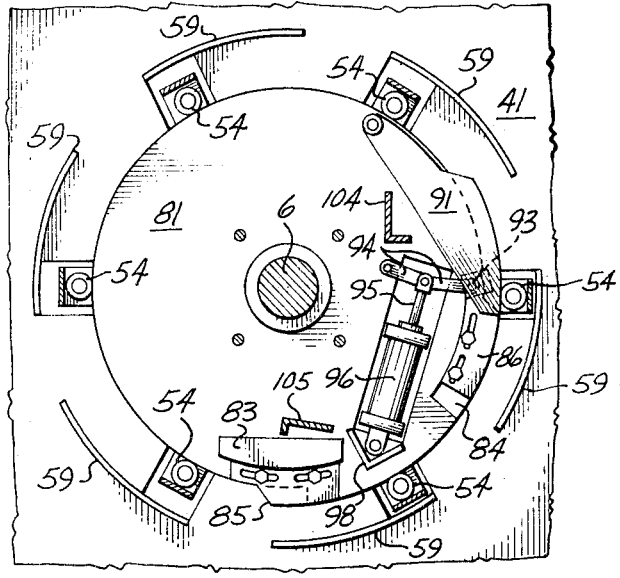
FIG. 11 is a partial side view of the cam assembly of the apparatus of this invention with certain parts broken away for better illustration thereof.

Optionally, a safety mechanism can be provided to prevent damage to the saw blade 11 if, for any reason, a wedge-shaped blank is inserted into the clamps incorrectly. The safety mechanism comprises an overriding cam 91 pivoted at 92 to cam disc 81 and at the other end to linkage mechanism 94 attached to piston 95 of fluid cylinder 96. Fluid cylinder 96 is secured to anchor bracket 98 by a cylindrical pin 97. Anchor bracket 98 is in turn secured to cam disc 81. FIG. 10 shows overriding cam 91 in inoperative position. FIG. 11 shows the overriding cam in operative position resulting on activation of fluid cylinder 96. When overriding cam 91 is activated by fluid cylinder 96, it provides an additional length of camming surface which holds the clamp assembly open a longer time, allowing it to pass through the feed position without pick up of a sawn blank. The safety assembly is activated by the photocell assembly located adjacent the feed assembly (see FIG. 2). The photocell assembly is positioned so that light from source 18 will hit the detector when a wedge-shaped blank is correctly positioned in the clamp assembly as shown in FIGS. 3 and 13. If, for any reason, the sawn blank should fail to clear light source 18, fluid cylinder 96 of the cam assembly is activated so that the incorrectly positioned blank is released before it reaches saw blade 11.

OPERATION OF THE APPARATUS

FIGS. 12 to 15 illustrate operation of the shake machine. A presawn wedge-shaped blank 110, having smooth plane faces 111 and 112, is placed in feeding position in the feed assembly. It is then fed manually or automatically into one of the clamping positions located around the periphery of base plate 41 of clamp assembly 40. The wedge-shaped blanks are fed into the clamps with their tapered end facing outwardly so that their butt end is held by the clamps. The blank is then rotated from feeding position to sawing position where a slot or kerf 113 is sawed part way through the blank. In order to accurately position the blank before and during sawing, an alignment surface 16 is provided adjacent saw blade 11 (see FIGS. 6 and 6a) as discussed previously. The two clamps 47 and 48 are adjusted so as to slant the blank toward alignment surface 16. When the blank engages alignment surface 16, it is forced into correct alignment just prior to entering saw blade 11. In this way, the blanks are accurately positioned for sawing and held in position during sawing. As seen in FIG. 14, when the sawn blank leaves saw blade 11, it engages alignment fin 69 and the top portion of wedge 63, which is knife-shaped. When the blank reaches the position shown in FIG. 15, wedge 63 is activated substantially at the same time the blank is released from the clamps. As the wedge is forced upwardly it splits the sawn blank into two halves as shown in FIG. 16, exposing a split grain face 114 and smooth plane faces 115 and 116.

Hand split shakes made according to the method and apparatus of this invention are much easier to lay than those split by hand because of the smooth plane surfaces 111 and 112 which lie flat against the sheathing of a roof surface and also, because of the smooth plane faces 115 and 116 over which a second layer of shakes may be laid. The split grain face 114 is exposed, giving the appearance and advantages of a natural split shake exposure when installed on the roof of a building. Because the shakes have smooth plane surfaces and are of a uniform nature, they are laid much easier and much faster than hand split shakes. The machine is also advantageous in that it can produce shakes at a much faster rate of speed than can be done by hand, employing fewer laborers and with much less danger to those employed.

What is claimed is:

1. An apparatus for cutting and splitting a tapered wood blank comprising
   (a) a movable means having thereon a plurality of clamping positions,
   (b) clamping means attached to each of the clamping positions for securing the butt end portion of a tapered wood blank,
   (c) a power driven saw positioned adjacent said movable means and a predetermined distance away so as to cut a kerf in the tapered end of the wood blank lengthwise thereof a predetermined distance,
   (d) splitting means positioned adjacent the saw and the movable means adapted to enter the kerf of the tapered wood blank and split the blank into two separate pieces, thereby exposing a natural split grain face,
   (e) means operatively connected to the splitting means for activating the splitting means at a predetermined time,
   (f) control means operatively connected to the clamping means for opening and closing the clamping means at predetermined times so as to allow pickup and release of the tapered wood blank,
   (g) said movable means being a rotatable plate having a plurality of clamping stations located on the outer periphery thereof.

2. The apparatus of claim 1 wherein the clamping means includes
   (a) a first clamping plate attached to the rotatable plate, (b) a second movable clamping plate in opposed relation to the first clamping plate, the second clamping plate biased toward the first clamping plate so as to secure the butt end of the tapered wood blank between the first and second clamping plates.

3. The apparatus of claim 1 wherein the control means for opening and closing the second clamping plate of the clamping means includes
   (a) a non-rotatable plate parallel to the rotatable plate and having around its outer circumference a camming surface, the camming surface having a first portion adapted to allow the second clamping plate to close and a second portion adapted to allow the second clamping plate to open, and
   (b) a cam engageable with the camming surface of the nonrotatable plate, the cam operatively connected to the second clamping plate.

4. The apparatus of claim 1 wherein the splitting means includes
   (a) an elongated splitting wedge parallel to and in line with the kerf of the sawn tapered wood blank, and
   (b) means operatively connected to the splitting wedge for injecting the wedge into the kerf of the tapered blank thereby splitting the blank into two separate pieces.

5. An apparatus for making natural split cedar shakes from presawn wedge-shaped wood blanks, the grain direction of which runs lengthwise of the blanks, comprising in combination,
   (a) a supporting frame,
   (b) a shaft journalled in the frame,
   (c) a rotatable circular plate attached at its center point to the shaft, the rotatable plate having a plurality of clamping positions located around the outer periphery thereof,
   (d) clamping means attached to each of the clamping positions on the rotatable circular plate, including
      (1) a first clamping plate attached to the rotatable circular plate, the face of the plate adapted to secure the butt end of the wedge-shaped blank,
      (2) a second clamping plate in opposed relation to the first clamping plate and pivoted for movement to and away from the first clamping plate, the second clamping plate biased toward the first clamping plate so as to firmly secure the butt end of the wedge-shaped blank between the first and second clamping plates,
      (3) a cam follower arm attached to the second clamping plate, and
      (4) a cam mounted on the cam follower arm adapted to engage a camming surface;
   (e) feeding means for feeding the wedge-shaped wood blanks into clamping position, the feed assembly including,
      (1) an elongated support for the wood blanks positioned adjacent the clamping means,
      (2) a movable carriage adapted to engage the tapered end of the wedge-shaped blanks and feed them between the first and second clamping plates of the clamping means;
   (f) a circular power saw mounted on an arbor and positioned opposite the feed assembly and adjacent the clamping means for sawing a kerf a predetermined distance lengthwise through the tapered end of the wedge-shaped blanks held by the clamping means;
   (g) a splitter assembly positioned adjacent the saw and in substantial alignment with kerf of the sawn wedge-shaped blank held by the clamping means, the splitter assembly including
      (1) a guide frame,
      (2) an elongated wedge movably mounted within the guide frame having mounted on its upper portion a splitter knife, the elongated surface of the splitter knife being parallel to the direction in which the wedge-shaped blank is moving, the splitter knife adapted to engage the kerf of the wedge-shaped blank held by the clamping means, and
      (3) a fluid ram connected between the wedge and the guide frame for forcing the wedge toward the clamping means, the ram having a fixed maximum stroke and comprising a cylinder member and a piston member, the cylinder member being connected to the guide frame and the piston member being connected to the wedge;
   (h) a cam assembly for controlling opening and closing of the second clamping plate of the clamping means including
      (1) a nonrotatable plate secured to the supporting frame, the plate having around its outer circumference a camming surface, the plate positioned adjacent and parallel to the rotatable circular plate so that the camming surface thereof is in contact with the cam of the second clamping plate, the camming surface having a first portion adapted to allow the second clamping plate to close at the point where the wedge-shaped blanks are fed between the first and second clamping plates, and a second portion adapted to open the second clamping plate and thereby release the wedge-shaped blank substantially simultaneously with activation of the splitting wedge so as to allow the split blanks to fall free of the apparatus; and
   (i) means mounted on the nonrotatable plate of the cam assembly for activating the fluid ram of the splitter assembly at a point where the wedge of the splitter assembly is positioned in the kerf of the wedge-shaped blank.

6. The apparatus of claim 5 including an elongated alignment surface positioned parallel and adjacent to the saw and extending from a point beginning just prior to the point where the wedge-shaped blank contacts the saw and ending where the wedge-shaped blank leaves the saw, the alignment surface serving to accurately position and stabilize the wedge-shaped blank before and during sawing.

7. The apparatus of claim 5 including an elongated alignment fin positioned between the saw and the splitting assembly and parallel to the direction of movement of the wedge-shaped blank, the alignment fin adapted to engage the kerf of the wedge-shaped blank held by the clamping means to align the blank for splitting by the wedge of the splitter assembly.

8. The apparatus of claim 5 including a safety means for preventing damage to the saw including
   (a) a cam segment having an overriding camming surface connected at one end to the nonrotatable plate adjacent that portion of the camming surface of the nonrotatable plate allowing the second clamping plate to open,
   (b) a fluid cylinder comprising a cylinder member and a piston member, the cylinder member being connected to the nonrotatable plate and the piston member being connected to the opposite end of the cam segment, the cam segment having a normal inoperative first position out of reach of the cam follower of the second clamping plate and an operative second position on activation of the fluid cylinder wherein the second clamping plate is held open during passage through the feed position.

9. The apparatus of claim 8 including means for activating the safety assembly when the wedge-shaped blank is not in correct alignment in the clamping means for sawing.

(References on following page)

References Cited

UNITED STATES PATENTS

| | | | |
|---|---|---|---|
| 2,245,868 | 6/1941 | Melby | 143—8 X |
| 3,315,717 | 4/1967 | Hughes | 144—13 X |
| 3,396,764 | 8/1968 | Ferguson | 144—13 X |

DONALD R. SCHRAN, Primary Examiner

U.S. Cl. X.R.

143—15; 144—193